April 3, 1962   O. K. SMITH   3,027,772
ROTARY ACTUATOR
Filed June 4, 1959

INVENTOR.
OLIN K. SMITH
BY Dybvig & Jacox
HIS ATTORNEYS

United States Patent Office 3,027,772
Patented Apr. 3, 1962

3,027,772
ROTARY ACTUATOR
Olin K. Smith, Dayton, Ohio, assignor to
Ledex, Inc., a corporation of Ohio
Filed June 4, 1959, Ser. No. 818,220
9 Claims. (Cl. 74—89)

This invention relates to a rotary actuator device for transforming a linear thrust into rotary motion, and more particularly to solenoid actuated devices for performing this function, however the invention is not necessarily so limited.

Rotary solenoid devices which transform the magnetically induced axial movement of an armature to rotary movement of an output shaft are in common usage. In one well known form the rotary actuator utilizes ball bearing elements operating in inclined recesses in opposing plates to transform the linear motion of the armature to rotary motion. In this type of actuator, a spring or the equivalent is used to set the ball bearing mechanism in an operative position. As will be made more apparent in the description which follows, this spring opposes the rotary output of the actuator device and thereby indirectly opposes the magnetically induced thrust of the armature.

In rotary actuator devices of this type it is sometimes desirable to maintain energization of the solenoid coil over long periods of time, holding the armature in its advanced position in opposition to the spring which biases the ball bearing mechanism. When this is attempted, however, the high current consumption of the solenoid coil during the holding period produces a problem with heat dissipation. As a result, attempts to hold the armature in opposition to the spring bias have led to premature failure of the solenoid coil.

An object of the present invention is to provide a rotary actuator device having a hold position, the construction being such that the forces required to maintain the device in the hold position are markedly less than the forces required to move the device to the hold position.

Another object of this invention is to provide a device for transforming linear movement to rotary movement through the medium of ball bearing elements operating on inclined races, the device having a hold position established by the provision of ridges or other imperfections in the inclined races which ridges are effective to trap the ball bearing elements.

Other objects and advantages reside in the construction of parts, the combination thereof, the method of manufacture and the mode of operation, as will become apparent from the following description.

Figure 1:
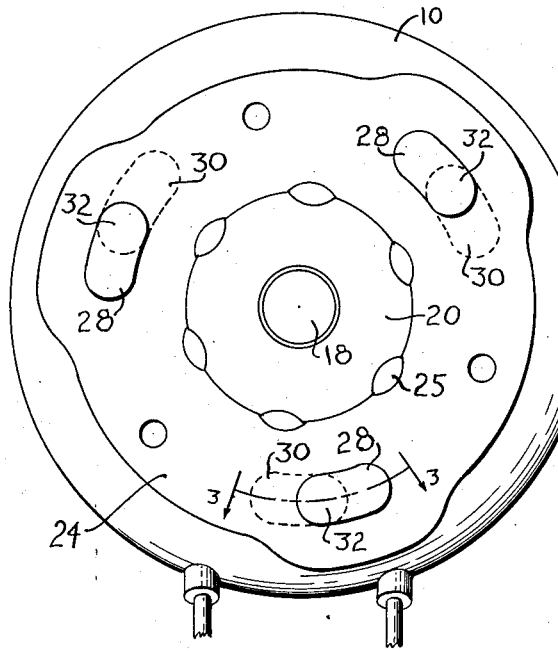
FIGURE 1 is an end elevation view of a solenoid operated rotary actuator device embodying the present invention.
Figure 2:
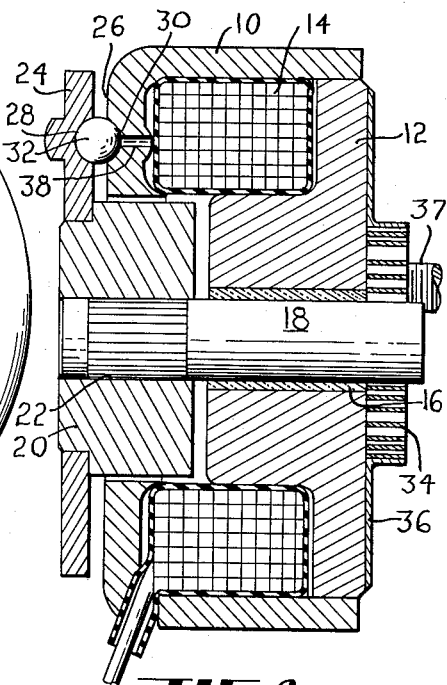
FIGURE 2 is a longitudinal sectional view of the device of FIGURE 1.
Figure 3:
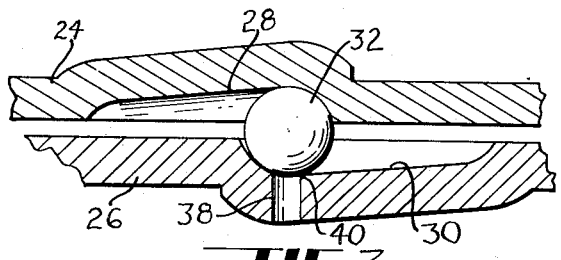
FIGURE 3 is a greatly enlarged fragmentary sectional view taken substantially along the line 3—3 in FIGURE 1.

Referring to the drawing in greater detail, the solenoid operated rotary actuator device of FIGURES 1, 2 and 3 comprises a generally cup shaped casing 10 into which is press-fitted a generally circular core element 12. Encircling this core element and partly nesting therein is a solenoid coil 14. This coil 14 and the core element 12 function together as an electromagnet.

A sleeve bearing 16 is press-fitted within a central aperture in the core element 12. This sleeve bearing supports a shaft 18 for axial and rotary movement. Adjacent the core element 12, an armature 20 is fixed to the shaft 18. Knurling 22 secures the armature 20 against rotary and axial movement relative to the shaft 18. The construction is such that electrical energization of the solenoid coil 14 will induce the armature 20 to move toward the core element 12, thus closing the air gap therebetween.

Press-fitted on the armature 20 is generally circular plate 24. To assist in securing the plate 24 fixedly with respect to the armature, the armature is peened against the inner margin of the plate 24 as illustrated at 25 in FIGURE 1.

In parallel relation to the plate 24 is an inwardly turned flange portion 26 integral with the casing 10. The plate 24 is provided with three arcuate recesses 28 concentric with the axis of the shaft 18 and spaced approximately 120° apart. Three similar arcuate recesses 30 are provided at 120° intervals in the flange portion 26 opposing the plate 24. A ball element 32 is trapped between each of the three opposing pairs of recesses 28 and 30. These ball elements serve as rolling anti-friction members.

As best seen in FIGURE 3, the opposing recesses 28 and 30 have oppositely inclined bases. The arrangement is such that, with the shallow ends of the opposing recesses aligned and the ball elements 32 nested therebetween, an axial force pressing the plate 24 toward the flange portion 26 will induce the plate 24 to rotate relative to the flange portion 26. This permits the ball elements 32 to move to the deep ends of the opposing recesses to the position illustrated in FIGURE 3. For convenience the plate 24 will hereafter be referred to as a rotor plate and the flange portion 26 will hereafter be referred to as a stator plate.

Preferably, a spring is used to bias the rotor plate relative to the stator plate so as to align the shallow ends of the recesses. A spring for this purpose is shown at 34 in FIGURE 2. The spring 34 is a spiral spring anchored at its inner end to the shaft 18 and anchored at its outer end to a supporting bracket 36. The supporting bracket 36 is secured fixedly to the rear face of the core element 12 by means of studs, such as the stud 37. The stud 37 is threaded to serve additionally as a mounting stud.

The spiral spring 34 applies a torque to the shaft 18, thereby rotating the plate 24 so as to urge the shallow ends of the recesses 28 and 30 into alignment. In so doing, spring 34 urges the armature 20 away from the core element 12. Thus, the spring 34 acts in opposition to the magnetic thrust delivered by the solenoid coil 14.

Upon energization of the solenoid coil 14, the armature 20 is attracted to the core element 12. However, before the armature can advance toward the core element 12, the magnetic attraction must overcome the opposition of the spring 34. When this opposition is overcome, the armature 20 may move toward the core element 12, whereupon the shaft 18 is advanced helically to the right as viewed in FIGURE 2.

It is sometimes desired to hold the shaft 18 in its helically advanced position in opposition to the spring 34. This requires that the solenoid coil 14 remain energized. Ordinarily, the solenoid hold current required to maintain the shaft 18 in its advanced position is that current which will develop a magnetic thrust on the armature in the advanced position which equals or exceeds the spring bias delivered to the plate 24 through interaction between the ball elements 32 and the inclined recesses 28 and 30. If the spring tension is increased, the hold current must be increased. If the arcuate recesses are given a steeper slope, the hold current may be decreased. If the recesses are given a flatter slope, the hold current must be increased. Numerous variables influence the hold current requirement, however, for the present purposes it suffices to note that the hold current required is dependent upon the spring tension and the slope of the arcuate recesses. It is the slope of the arcuate recesses which determines the mechanical advantage between the spring and the armature, and in the present invention means have been devised for drastically reducing the mechanical advantage between the spring and armature in the hold position to thereby enable a marked decrease in the hold current required.

Referring to FIGURE 3 of the drawing, a boring 38 is illustrated in the deep end of the recess 30. One such boring is provided in each recess 30 of the flange portion 26. The diameter of these borings is small in relation to the diameter of the ball elements 32, and is just sufficient that the ball elements 32 will dip slightly into the borings as they roll to the deep ends of the recesses 30. The location of the borings is such that the ball elements 32 will roll to the deep ends of the recesses 30 and become seated in the borings 38 upon energization of the solenoid coil 14 to draw the armature 20 toward the core element 12. Once the ball elements have seated in the borings 38 the upper margins 40 of the borings constitute ridges opposing rolling movement of the ball elements out of the borings. In practical effect, the ball elements must execute a rather steep axial movement out of the borings 38 before they can roll freely in the recesses 30. Thus, when the solenoid coil 14 is used to hold the armature in its inward position the ball elements 32 must be moved axially in almost direct opposition to the magnetic forces on the armature before they can roll freely in the recesses 30. This gives a marked advantage to the solenoid coil in holding the armature in position against the opposition of the spring 34. In other words, the spring 34 is at a mechanical disadvantage.

A second means by which the borings 38 give advantage to the solenoid coil 14 results from the fact that dipping movement of the ball elements into the borings permits the armature 20 to move slightly closer to the core element 12. Since the magnetic attraction between the core element and the armature follows the inverse square law approximately, even a slight closing of the gap between these two elements will enhance the magnetic attraction therebetween.

Provision of the borings 38 in the recesses 30 gives a definite advantage to the solenoid coil 14, and it follows that the hold current for the coil 14 may be reduced materially without impairing the ability of the coil to hold the armature 20 and the shaft 18 therewith in the advanced position. With this reduction in the hold current requirement the problem of heat dissipation when the coil is energized for prolonged periods of time is materially alleviated.

Figure 4:
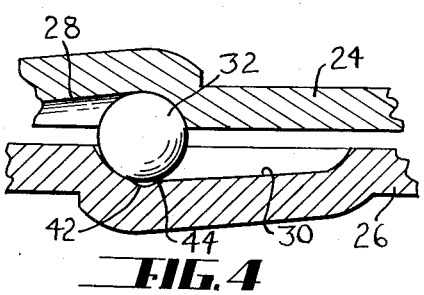
FIGURE 4 is a greatly enlarged fragmentary sectional view analogous to that of FIGURE 3 illustrating a modification.

It will occur to those skilled in the art that other means may be employed to impart mechanical advantage to the solenoid coil in the hold position. Thus in FIGURE 4 a dimple 42 is peened into the deep end of the recess 30. The margin 44 surrounding this dimple constitutes an offset or ridge opposing movement of the ball element 32 out of the dimple.

Figure 5:
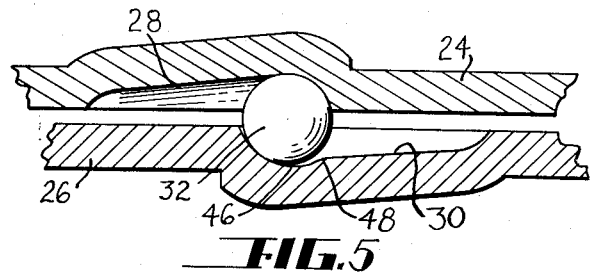
FIGURE 5 is a greatly enlarged fragmentary sectional view analogous to that of FIGURE 3 illustrating another modification.

In FIGURE 5 another modification is shown wherein the base of the recess 30 is provided with a compound curvature, there being a well 46 formed in the deep end of recess. The margin 48 of this well forms an offset or ridge opposing movement of the ball element 32 out of the well in the same manner as the ridges 40 and 44 in the embodiments of FIGURES 3 and 4, respectively. It is apparent that these embodiments do not exhaust the possible related means by which advantage can be given the solenoid coil with consequent disadvantage to the spring 34.

While the provision of ridges or offsets in the recesses of the stator plate 26 has been illustrated in the present embodiment, it will be obvious to those skilled in the art that similar results may be obtained by providing the ridges or offsets in the recesses 28 of the rotor plate 24. It is apparent that an even more pronounced effect can be obtained by providing duplicate ridges or offsets in both the rotor and the stator plates.

It will also occur to those skilled in the art that various changes may be made in the shape and arrangement of the inclined recesses. In this regard, it is to be recognized that any surface configuration in the opposing rotor and stator plates which provides an arcuate axially sloped elevation gradient for interaction with each ball element 32 will suffice to transform the axial armature movement to rotary movement. Any means by which such elevation gradient is interrupted to provide an offset or ridge for trapping the ball element is deemed to be within the purview of this invention.

Solenoid operated rotary actuator units have been illustrated for convenience and it is to be understood that this invention may be employed in other than solenoid operated units. For example, power for actuating the shaft 18 may be obtained hydraulically or pneumatically rather than electromagnetically.

Although the preferred embodiments and various modifications of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In a rotary actuator device comprising a rotor member and a stator member supported for relative axial and rotary movement, said members having opposing axially spaced surfaces at least one of which is inclined axially along an arcuate path concentric to the axis of relative rotation between said members, and an anti-friction element disposed between said opposing surfaces whereby an axial force driving said members together will induce the members to rotate one relative to the other, the improvement wherein one of said members has an offset portion in the surface thereof forming a ridge for trapping said anti-friction element.

2. The improvement according to claim 1 wherein said anti-friction element is a ball element and wherein said offset portion comprises a boring passing into said surface, said boring having a diameter less than the diameter of said ball element.

3. In a rotary actuator device, the combination including a stator member and a rotor member supported for relative axial and rotary movement, said members having opposing axially spaced surfaces, a rolling anti-friction element interposed between said opposing surfaces, and means providing an axially varying elevation gradient in one of said surfaces concentric to the axis of rotation between said members, said elevation gradient providing a rolling surface for said anti-friction element whereupon an axial force driving said members together will induce said anti-friction element to roll along said gradient imparting relative rotation to said members, the improvement wherein said elevation gradient is provided with an offset portion forming a ridge for trapping said anti-friction element.

4. In a rotary actuator device including, in combination, a rotor member, a stator member, means supporting said members in spaced relation for relative axial and rotary movement about a common axis, said members having axially spaced opposing surfaces with at least one of said surfaces having an elongate arcuate recess therein concentric to said common axis, said recess having an axially inclined base, and a rolling anti-friction element interposed between said surfaces so as to engage in rolling contact with the inclined base of said recess and with the surface opposite thereto, the improvement wherein said inclined base has an offset portion therein adjacent one end of said recess forming a ridge for trapping said anti-friction element in that end of the recess.

5. The improvement according to claim 4 wherein the offset portion in the inclined base is located adjacent to that end of the recess which is most remote from the opposing surface.

6. In a rotary actuator device for transforming a linear thrust to rotary motion, said device comprising, in combination, a rotor member, a stator member, means supporting said members in spaced relation for relative axial and rotary movement about a common axis, said members having axially spaced opposing surfaces each having an elongate arcuate recess therein concentric to said common axis, each said recess having an axially inclined base, a rolling anti-friction element positioned between said opposing surfaces for simultaneous rolling engagement with the bases of said recesses, actuator means for supplying an axial thrust to compress said rotor and stator members upon said anti-friction element and thereby impress rotary motion on said rotor member, and yielding means opposing the impressed rotary motion for normally biasing said rotor member to an extreme rotary position, the improvement wherein the base of one of said recesses has an offset portion adjacent that end thereof which is remote from the opposing recess, said offset portion forming a barrier placing said yielding means at a mechanical disadvantage and retarding rolling movement of the anti-friction element away from the remote end of said recess.

7. The improvement according to claim 6 wherein said rolling anti-friction element is a ball element and wherein said offset portion is a boring having a diameter less than that of the ball element passing into the base of said one recess.

8. The improvement according to claim 6 wherein said rolling anti-friction element is a ball element and wherein said offset portion comprises a dimple formed in the base of said one recess.

9. The improvement according to claim 6 wherein the base of said recess has a compound curvature providing a ridge and adjacent well in that end of the recess which is remote from the opposing recess.

References Cited in the file of this patent
UNITED STATES PATENTS

| | | |
|---|---|---|
| 2,496,880 | Leland | Feb. 7, 1950 |
| 2,566,571 | Leland | Sept. 4, 1951 |
| 2,763,793 | Krasney | Sept. 18, 1956 |